United States Patent [19]
Kroll et al.

[11] Patent Number: 6,047,594
[45] Date of Patent: Apr. 11, 2000

[54] DIGITAL TURN PLATE APPARATUS

[75] Inventors: William P. Kroll, Medina; Karl J. F. Kroll, Maple Grove; Bruce G. Rhoe, Wayzata, all of Minn.

[73] Assignee: Intercomp Company, Minneapolis, Minn.

[21] Appl. No.: 08/861,883

[22] Filed: May 22, 1997

Related U.S. Application Data

[60] Provisional application No. 60/018,189, May 23, 1996.

[51] Int. Cl.$^7$ .................................................. G01B 5/24
[52] U.S. Cl. .................... 73/122; 33/203.12; 33/203.14; 33/203.16; 33/203.18
[58] Field of Search ............................... 73/11.04, 865.9, 73/122, 124, 127; 33/203.12, 203.14, 203.16, 203.18, 203.19

[56] References Cited

U.S. PATENT DOCUMENTS

| | | | |
|---|---|---|---|
| 2,160,226 | 5/1939 | Phillips | 33/203.12 |
| 3,161,965 | 12/1964 | Taylor | 33/203.12 |
| 3,188,747 | 6/1965 | Race | 33/203.12 |
| 3,231,983 | 2/1966 | Bender | 33/203.12 |
| 3,758,958 | 9/1973 | Jordan | 33/203.18 |
| 3,875,672 | 4/1975 | Castoe | 33/203.12 |
| 3,956,830 | 5/1976 | MacMillan | 33/203.18 |
| 4,029,369 | 6/1977 | Hunter et al. | 308/36.1 |
| 4,167,816 | 9/1979 | Jarman et al. | 33/203.12 |
| 4,280,280 | 7/1981 | Eck et al. | 33/203.12 |
| 4,480,389 | 11/1984 | Capovilla | 33/203.12 |
| 4,897,926 | 2/1990 | Altnether et al. | 33/203.12 |
| 4,924,591 | 5/1990 | Brodu | 33/203.14 |
| 5,287,626 | 2/1994 | Reich | 33/203.14 |
| 5,522,139 | 6/1996 | Rossato | 33/203.12 |
| 5,604,296 | 2/1997 | Nozaki | 33/203.12 |
| 5,811,657 | 9/1998 | Fagerdahl | 33/203.14 |

*Primary Examiner*—Eric S. McCall
*Attorney, Agent, or Firm*—Skinner and Associates

[57] ABSTRACT

A digital turn plate apparatus for aligning steering systems of wheeled devices. The turn plate apparatus has a rotational degree of motion for determining the angle of wheel alignment. The turn plate apparatus also has lateral and longitudinal degrees of motion to accommodate the lateral and longitudinal motion of the bottom of tires which can occur during turning or when the suspension is compressed. The turn plate apparatus generally includes a base, a top plate, a handle plate, a lower middle plate, a potentiometer, and a digital display mechanism. The top plate is rotatably mounted to the handle plate and is functionally engaged with the potentiometer. The turn plate apparatus digitally displays the rotational position of the top plate to within a tenth of a degree. The handle plate is constructed to have a longitudinal degree of motion with respect to the base and the lower middle plate is constructed to have a lateral degree of motion with respect to the base.

25 Claims, 8 Drawing Sheets

DIGITAL TURN PLATE APPARATUS

CROSS-REFERENCE TO RELATED APPLICATIONS

This application claims the benefit, under 35 U.S.C. 119(e), of U.S. provisional application Serial No. 60/018,189, filed May 23, 1996.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

The present invention relates, generally, to vehicle maintenance equipment. More particularly, the invention relates to an automobile steering system alignment tool. The invention has particular utility in the automotive industry. However, the invention may also have utility in other applications.

2. Background Information

In the past, various devices and methods have been used or proposed to align or otherwise maintain the steering systems of automobiles. Also known are turn plate devices for aligning tires and for adjusting the tires to have a predetermined toe-in and toe-out. However, these devices and methods have significant limitations and shortcomings. Specifically, prior art turn plate devices are analog-type devices and are unable to provide clear and accurate readings for angles less than one degree. Accurate readings are especially critical in the racing industry where slight adjustments significantly affect the performance of the automobile.

Despite the need in the art for a turn plate that overcomes the disadvantages, shortcomings and limitations of the known art, none insofar as is known has been developed. Accordingly, it is an object of the present invention to provide an improved turn plate which overcomes the limitations and shortcomings of the known art. Specifically, it is an object to provide a turn plate that is accurate, easy to use, and portable.

BRIEF SUMMARY OF THE INVENTION

The present invention provides a digital turn plate apparatus or turn plate for use in adjusting a steering system. The turn plate possesses a rotational degree of motion for adjusting the alignment of tires to be parallel, or to have a predetermined toe-in or toe-out. The turn plate is also used for adjusting and measuring "bump steer" and the Ackermann angle of the steering system. The turn plate is capable of accurately measuring and displaying the alignment, or angular position, of a tire. This accuracy is desirable in all vehicles, especially in racing automobiles, because slight modifications significantly affect the handling, steering, and braking of the automobile and affect tire wear. The present invention also possesses a longitudinal degree of motion and a lateral degree of motion to allow for longitudinal and lateral movement due to factors such as suspension compression and brake loads.

The turn plate generally consists of, proceeding from the top layer to the bottom layer, a top plate, an upper bearing retainer and associated bearings, a handle plate, a middle bearing retainer and associated bearings, a lower middle plate, a lower bearing retainer and associated bearings, a base, a potentiometer, and a display. The top plate, upper bearing retainer and associated bearings are capable of being rotated or turned in a horizontal plane about the rotational center of the upper bearing retainer. A potentiometer and display indicate the degree of rotation and thus can be used to adjust the tire alignment, including the Ackermann angle, to be parallel, or to have a predetermined toe-in or toe-out. The handle plate, middle bearing retainer, and associated bearings are capable of being horizontally moved in a longitudinal direction in relation to the base. The lower middle plate, lower bearing retainer, and associated bearings are capable of being horizontally moved in a lateral direction in relation to the base, wherein the lateral direction is perpendicular to the longitudinal direction. The lateral and longitudinal motions compensate for the lateral and longitudinal motion of the bottom of the tire that can occur while the tire is turning or when the suspension is compressed.

The features, benefits and objects of this invention will become clear to those skilled in the art by reference to the following description, claims and drawings.

BRIEF DESCRIPTION OF THE SEVERAL VIEWS OF THE DRAWING

FIG. 4 is a top view of tires aligned to have toe-in.

DETAILED DESCRIPTION

An example of the preferred embodiment of the digital turn plate or turn plate 10 of the present invention is illustrated in FIGS. 1, 2, 13–20. The turn plate has distinct advantages over the known art. These advantages include its accuracy, its ease of use, and its portability. The turn plate 10 includes, generally proceeding from the top layer to the bottom layer, a top plate 12, a top plate bearing retainer 14 and associated bearings, a handle plate, or first middle plate 16, a middle bearing retainer 18 and associated bearings, a lower middle plate, or second middle plate 20, a lower bearing retainer 24 and associated bearings, and a base 26. A preferred embodiment uses roller bearings within the bearing retainers 14, 18, and 24, although it is anticipated that other bearings such as ball bearings can be used. The upper bearing retainer 14 and associated bearings provide a horizontal, rotational degree of motion about its center. The middle bearing retainer 18, the lower bearing retainer 24, and their associated bearings provide horizontal longitudinal and lateral degrees of motion that are perpendicular to each other. An electrical system 28, including a potentiometer 30 and digital display 32, measures and displays the rotational displacement of the top plate 12.

The turn plate 10 is suitable for use in general steering alignment, particularly in aligning the steering of automobiles. Tire alignment can be adjusted to the Ackermann angle of the steering system, to be parallel, or to have a predetermined toe-in or toe-out. Furthermore, the turn plate 10 can be used to measure and adjust "bump steer," which is the tire motion that occurs when turning or when the suspension is compressed. Slight modification in the alignment of tires can significantly affect the handling, steering, braking, and tire wear of the automobile.

Figure 1:
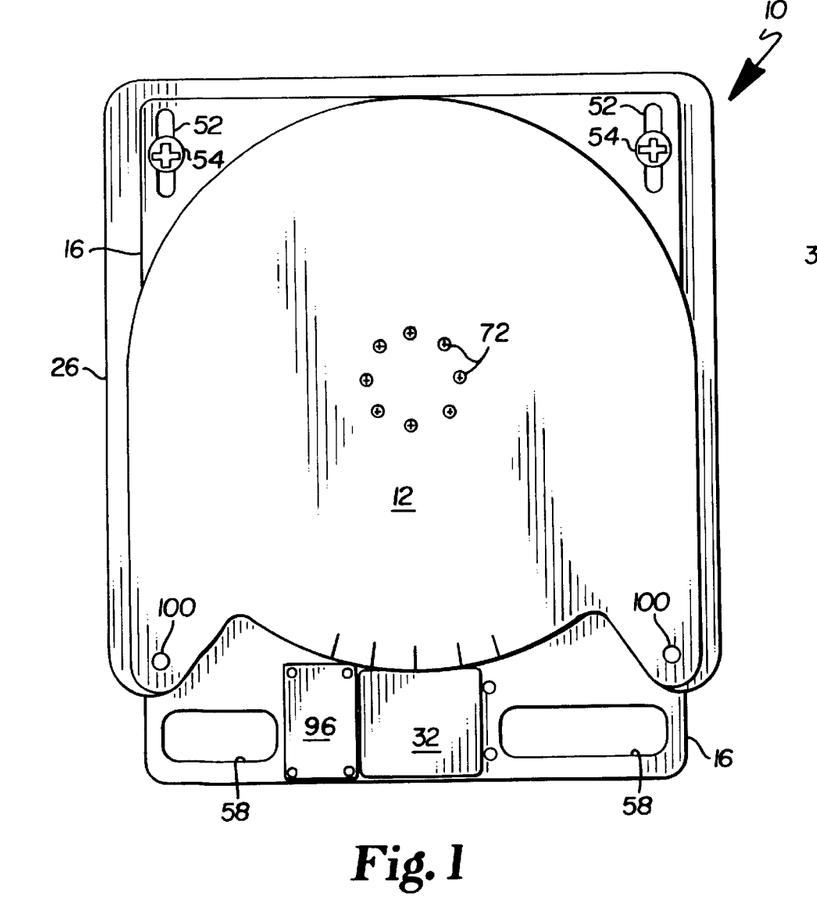
FIG. 1 is a top view of the digital turn plate of the present invention.
Figure 2:
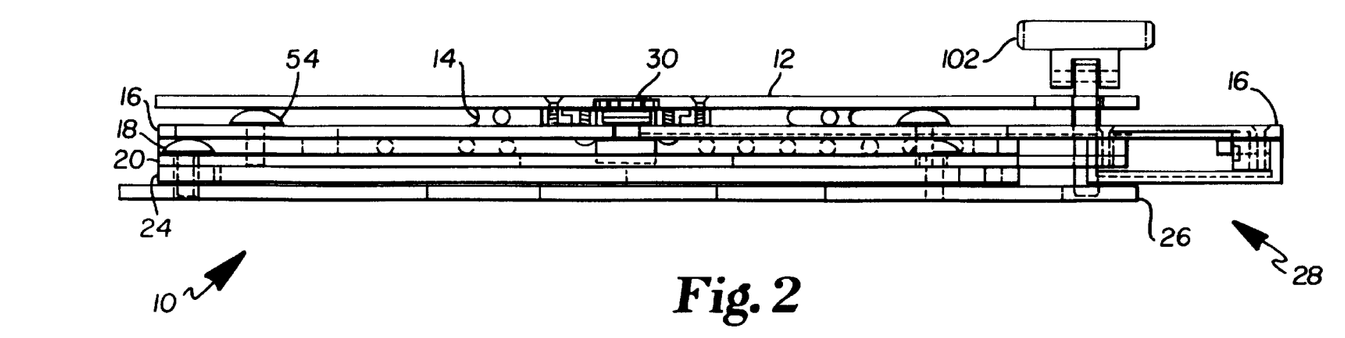
FIG. 2 is a side view of the digital turn plate of FIG. 1.
Figure 3:
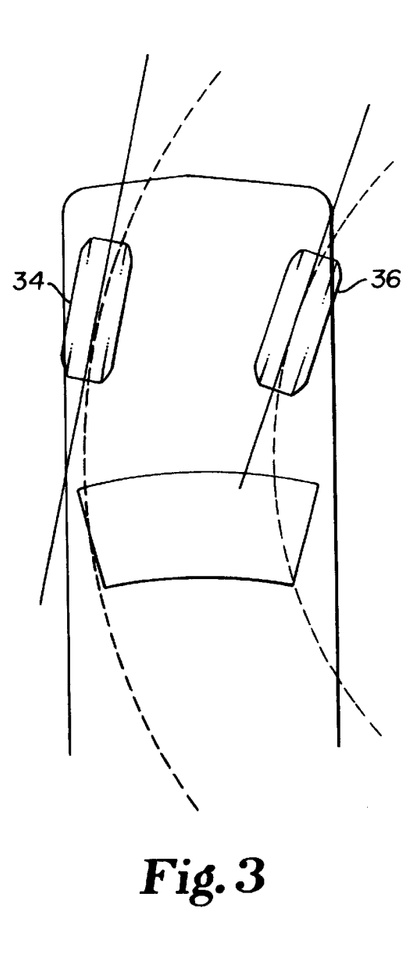
FIG. 3 is a top view showing the Ackermann angle between front tires.

FIG. 3 illustrates the Ackermann angle. When an automobile negotiates a turn, the outside tire 34 travels further than the inside tire 36 because it is making a larger arc. As a consequence, steering mechanisms are designed to allow the outside tire 34 to turn less than the inside tire 36. The difference between the steering angles of the two wheels is the Ackermann angle. The Ackermann angle reduces the wear of tires caused by scrubbing. A steering system can be designed to have an Ackermann angle that optimizes the performance of the automobile in negotiating corners of a known radius.

Figure 4:
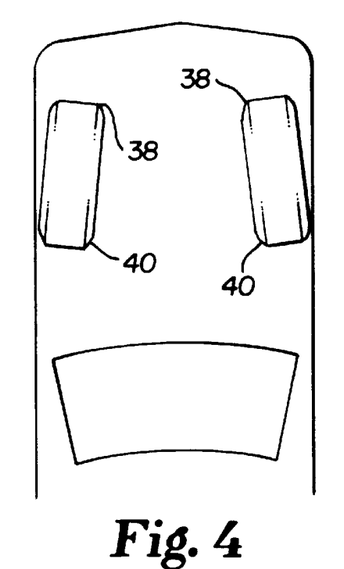
Figure 5:
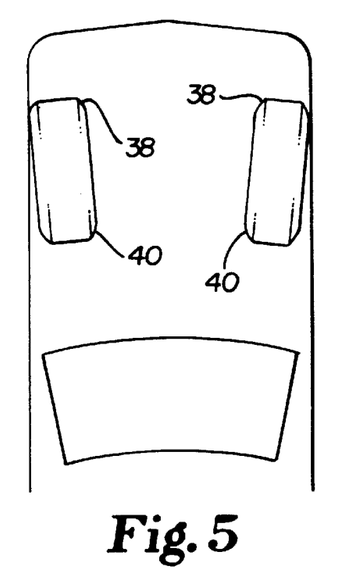
FIG. 5 is a top view of tires aligned to have toe-out.

FIG. 4 illustrates front tire alignment having toe-in where the front edges 38 of the tires are closer to each other than the rear edges 40 of the tires. FIG. 5 illustrates front tire alignment having toe-out where the front edges 38 of the tires are further apart than the rear edges 40 of the tires. Toe affects both handling and tire wear. Toe is desirable to compensate for the dynamic forces applied to the tires when the automobile is in motion. In rear-wheel-drive cars, the front tires have a tendency to be pushed back in relation to the automobile and to toe out when the automobile moves forward. Therefore, a predetermined toe-in will allow a rear-wheel-drive automobile to operate at near zero toe at a predetermined speed. In front-wheel-drive cars, the front tires have a tendency to pull themselves forward in relation to the automobile and to toe in when the automobile moves forward. Therefore, a predetermined toe-out will allow a front-wheel-drive automobile to operate at near zero toe at a predetermined speed.

Figures 6, 7:
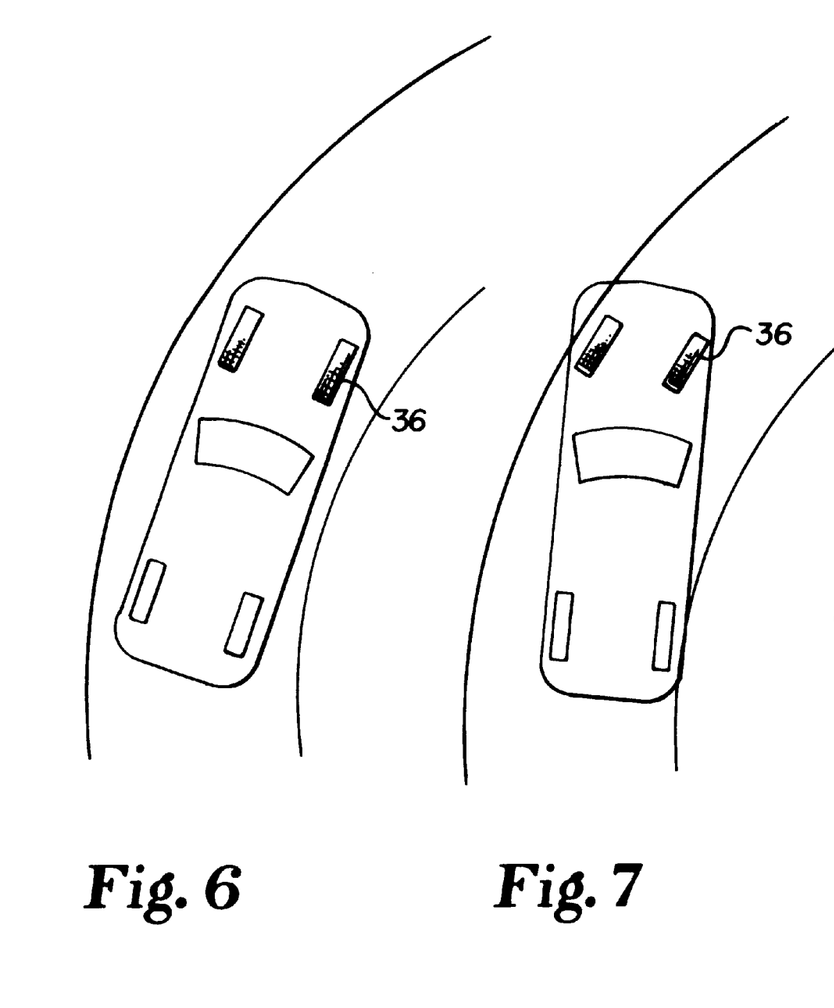
FIG. 6 is a top view of an automobile with neutral steer negotiating a curve.
FIG. 7 is a top view of an automobile with understeer negotiating a curve.
Figure 8:
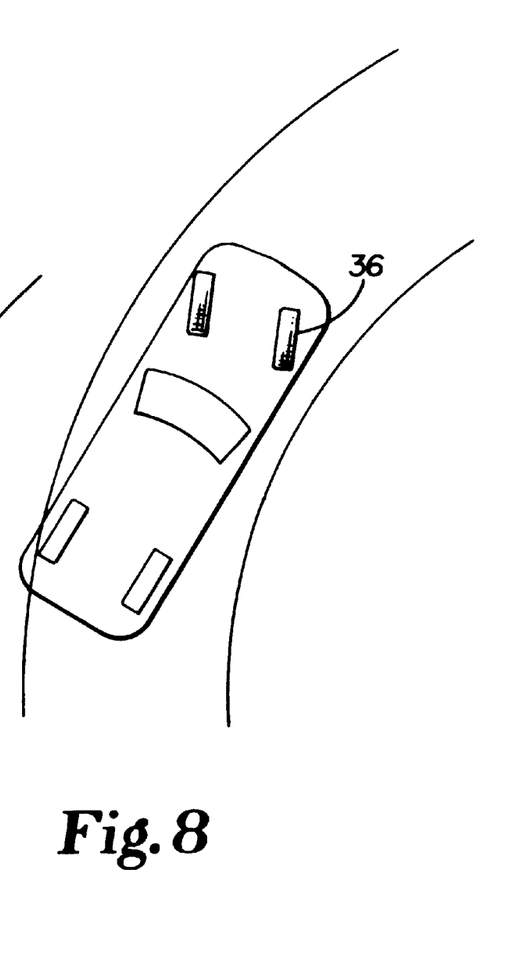
FIG. 8 is a top view of an automobile with oversteer negotiating a curve.

In addition, toe can affect how the automobile negotiates corners by contributing to understeer or oversteer. FIG. 6 illustrates an automobile that has neutral steer negotiating a curve. Toe-in contributes to understeer because the inside tire 36 is pointed out away from the corner. As shown in FIG. 7, understeer causes the car to plow into turns. Toe-out contributes to oversteer because the inside tire 36 is pointed into the turn. Oversteer is illustrated in FIG. 8.

Figure 9:
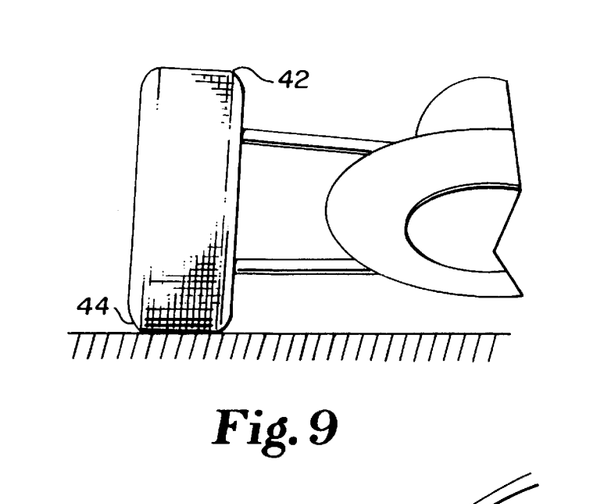
FIG. 9 is a front view of a tire having negative camber.
Figure 10:
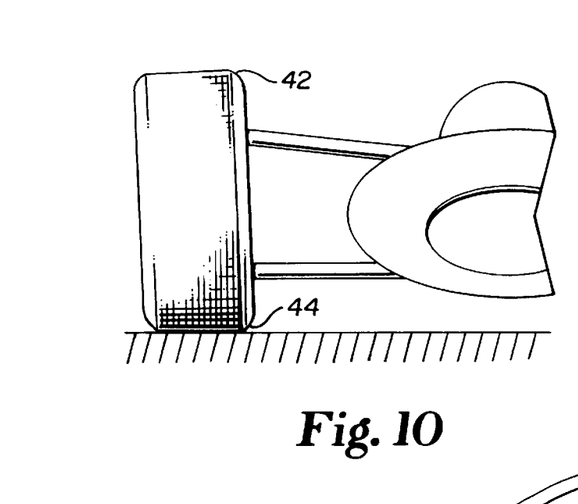
FIG. 10 is a front view of a tire having positive camber.

FIG. 9 illustrates a tire having negative camber. Negative camber exists when the top edge 42 of the tire tips inward toward the automobile. FIG. 10 illustrates a tire having positive camber Positive camber exists when the top edge 42 of the tire tips outward away from the automobile. An automobile will have maximum cornering power and optimal directional stability when the camber on the outside tire is nearly zero while negotiating a corner. Because the automobile will compress its suspension during a turn, the outside tire will move up in relation to the automobile body. Therefore, it is desirable to generally provide a slight positive camber when the car is level. The optimal camber for tires on a racing automobile will depend on the numerous factors such as mass of the automobile, the automobile's suspension, the automobile's optimal speed, and the grade of the corners of the track.

Figure 11:
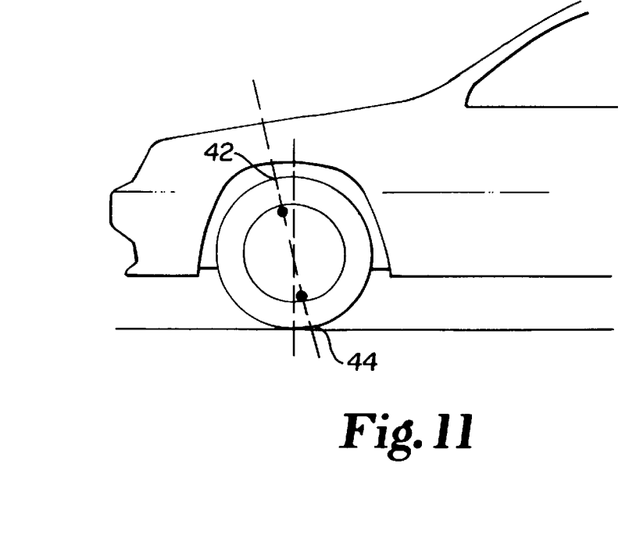
FIG. 11 is a side view of a tire having negative caster.
Figure 12:
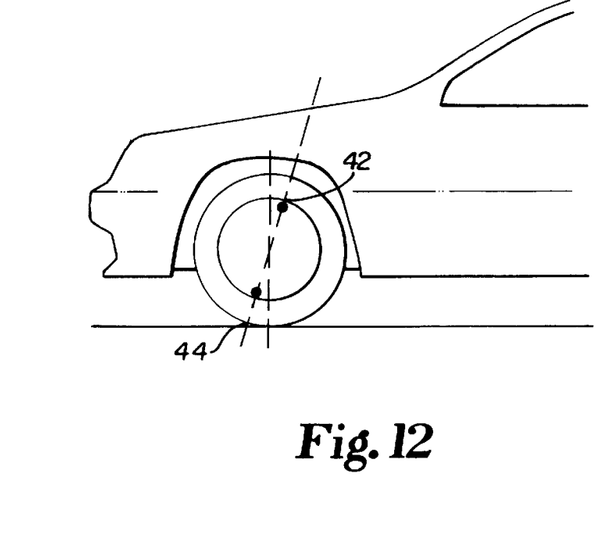
FIG. 12 is a side view of a tire having positive caster.

Caster refers to an imaginary line drawn through the upper and lower ball joints and is the axis about which the tire is steered. FIG. 11 illustrates a tire having negative caster. Negative caster exists when the top edge 42 of the tire is tipped forward. FIG. 12 illustrates a tire having positive caster. Positive caster exists when the top edge 42 of the tire is tipped rearward. Caster provides the self-centering force that causes the tire to return to the direction the car is traveling after a turn, and as such affects the directional stability and steering effort. Caster has a particularly noticeable affect on the steering while on a banked turn. A positive caster provides high speed stability at the cost of heavy steering at lower speeds. Larger positive caster will provide more stability at higher speeds. A negative caster provides easy steering at low speeds at the cost of instability and wandering at higher speeds.

A caster/camber gauge is used to measure the camber angle. A caster/camber gauge could measure the caster angle by itself if it were possible to turn the tire ninety degrees so that the side of the tire faces the vehicle's forward direction. However, steering systems do not allow tires to turn ninety degrees. Therefore, the caster angle is approximated using the turn plate 10 in combination with a caster/camber gauge. The turn plate 10 is used to turn the tire to a predetermined angle. The caster/camber gauge measures the camber angle of the tire at the predetermined angle. The caster angle is then approximated by multiplying the measured camber angle at the predetermined angle with a known conversion factor for that predetermined angle.

FIGS. 1, 13–20 illustrate a preferred embodiment of the turn plate 10. The turn plate 10 has three degrees of horizontal motion: rotational, lateral, and longitudinal. The lateral and longitudinal motions are horizontal and are perpendicular with respect to each other. The terms "lateral" and "longitudinal" are descriptive terms used as an aid to describe how the motions of the turn plate relate to the alignment of a tire. The terms assume an orientation of the base 26 with respect to the automobile tires and may be interchanged when the orientation of the base 26 is rotated ninety degrees with respect to the automobile tires. The rotational degree of motion allows the turn plate 10 to be used to adjust tire alignment to the Ackermann angle of the steering system, to be parallel, or to have toe-in or toe-out. An electrical system 28 measures and digitally displays the rotational angle in whole degrees and in tenths of degrees. The lateral degree of motion allows the turn plate 10 to compensate for the lateral motion of the bottom edge 44 of the tire when the tire is turned or when the suspension is compressed. The longitudinal degree of motion allows the turn plate 10 to compensate for the longitudinal motion of the bottom edge 44 of the tire when the suspension is compressed. Furthermore, the axis of rotation for a tire with non-zero camber or non-zero caster might not run through the bottom edge of the tire. Therefore, the bottom edge 44 of a tire will not rotate in the same place when a tire having non-zero camber or non-zero caster is turned. The longitudinal and lateral motion of the turn plate 10 allow the tire to generally remain in the rotational center of the top plate 12.

Figure 13:
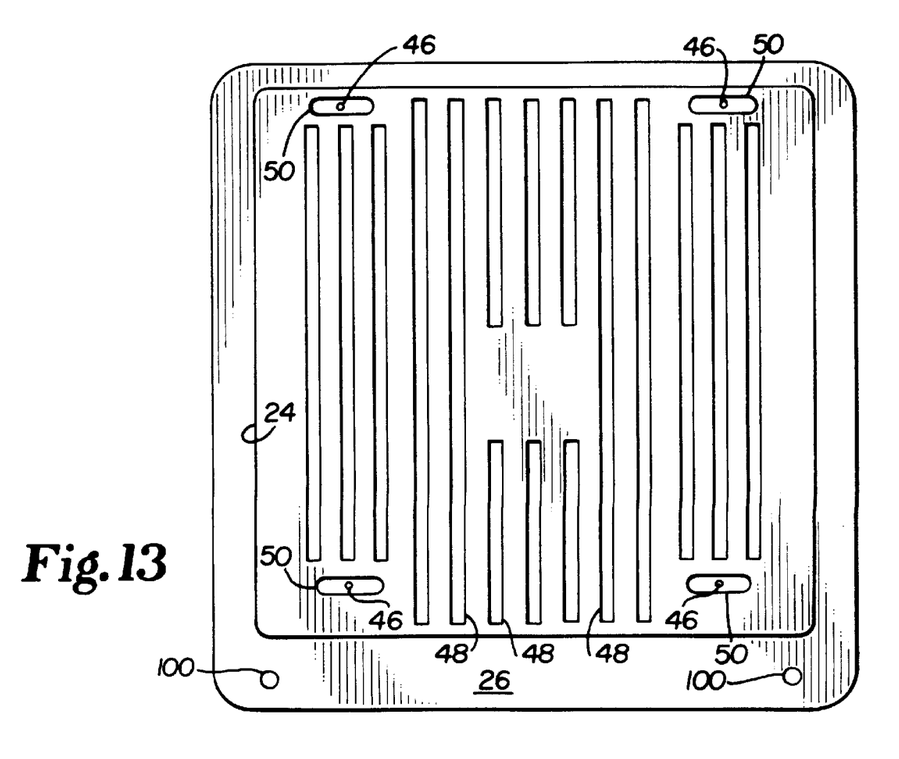
FIG. 13 is a top view of a partially assembled turn plate showing the base plate and lower bearing retainer.

The construction of the turn plate 10 will be described from the bottom layer to the top layer. FIG. 13 shows the base 26 and the lower bearing retainer 24. The base 26 has four tapped screw holes 46. The lower bearing retainer 24 has a plurality of roller bearing slots 48 sized to receive a plurality of roller bearings and has four lateral screw slots 50. The roller bearing slots 48 are arranged parallel to each other. The lower bearing retainer 24 is oriented on the base 26 in such a manner so as to roll, for the purposes of this description, laterally.

Figure 14:
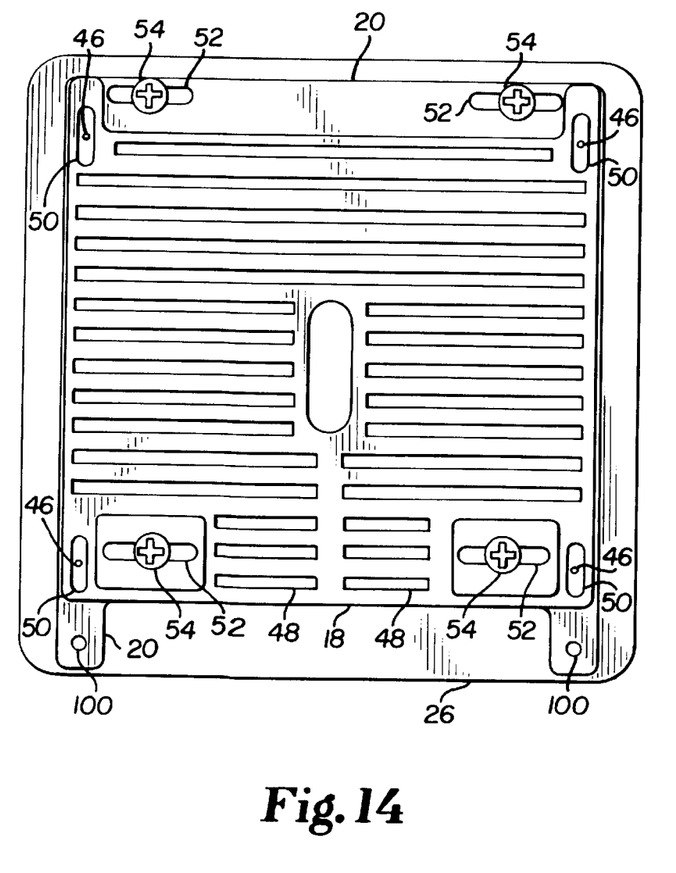
FIG. 14 is a top view of a partially assembled turn plate showing the base plate, lower middle plate, and middle bearing retainer.

FIG. 14 shows the lower middle plate 20 resting on the lower roller bearings found within the lower bearing retainer 24 causing it, and all elements above it, to have a lateral degree of motion with respect to the base 26. The lower middle plate 20 includes four lateral guide slots 52 and tapped screw holes 46. Four screws 54 are inserted into bushings 56 and screwed through the guide slots 52 into the tapped screw holes 46 in the base 26. The screws 54 secure the lower middle plate 20 to the base 26 while the bushings 56 and lateral guide slots 52 govern the motion of the lower middle plate 20 into a stable, lateral motion. The middle bearing retainer 18 lies on top of the lower middle plate 20. The middle bearing retainer 18 has a plurality of roller bearing slots 48 sized to receive a plurality of roller bearings and has four longitudinal screw slots 50. The roller bearing slots 48 are arranged parallel to each other. The middle bearing retainer 18 is oriented on the lower middle plate 20 in such a manner so as to roll, for the purposes of this description, longitudinally.

Figure 15:
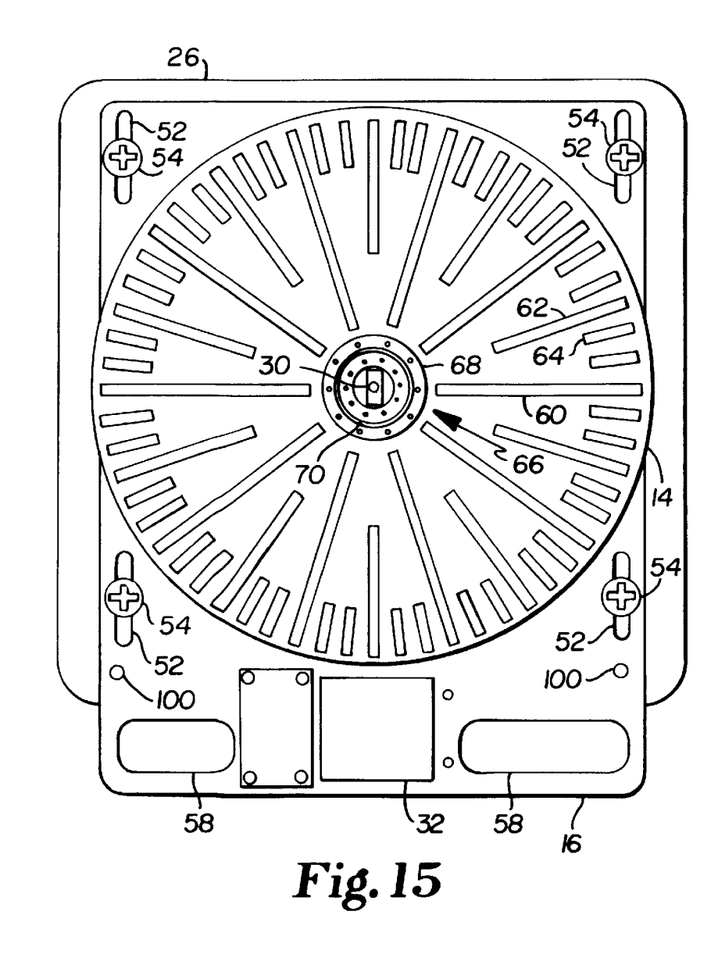
FIG. 15 is a top view of a partially assembled turn plate showing the base plate, handle plate, and upper bearing retainer.

FIG. 15 shows the handle plate 16 resting on the middle roller bearings causing it, and all elements above it, to have a longitudinal degree of motion with respect to the base 26. The handle plate 16 has two handle apertures 58 and four longitudinal guide slots 52. Four screws 54 are inserted into bushings 56 and screwed through the guide slots 52 into the tapped screw holes 46 in the lower middle plate 20. The screws 54 secure the handle plate 16 to the lower middle plate 20 while the bushings 56 and longitudinal guide slots 52 govern the motion of the handle plate 16 into a stable, longitudinal motion. The upper bearing retainer 14 lies on top of the handle plate 16. The upper bearing retainer 14 has a plurality of roller bearing slots 48 that contain a plurality of roller bearings. The roller bearing slots 48 are arranged radially outward in such a manner as to rotate about the center of the upper bearing retainer 14. The embodiment shown uses long 60, intermediate 62, and short 64 roller bearing apertures to optimize the radially spacing of the roller bearings.

Figure 16:
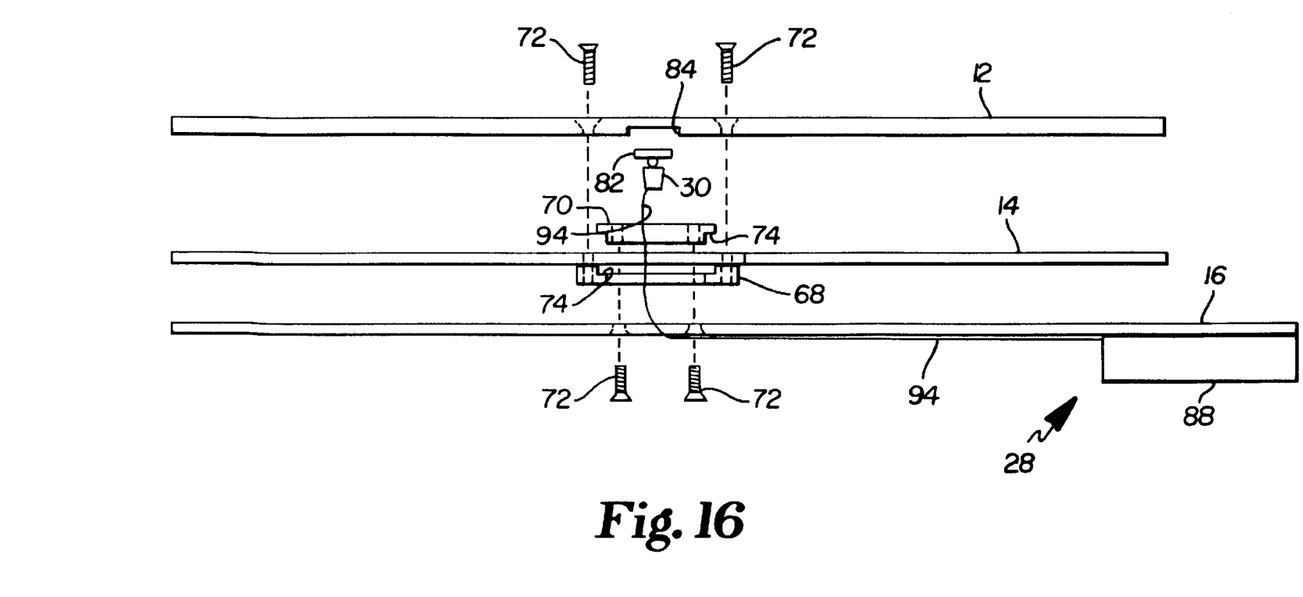
FIG. 16 is an exploded side view of the top plate, upper bearing retainer, handle plate, coupling mechanism, and potentiometer.

The top plate 12 lies on top of the upper roller bearings and is rotationally coupled to the handle plate using a coupling mechanism 66, thus giving the top plate 12 a rotational degree of motion. As shown in FIG. 16, the coupling mechanism 66 includes a lower ring retainer 68 and an upper ring retainer 70. A plurality of machine screws 72 attach the handle plate 16 to the upper ring retainer 70 and attach the top plate 12 to the lower ring retainer 68. Both the upper 70 and lower 68 ring retainers have lips 74 that cooperate with each other to secure the top plate 12 to the handle plate 16 while allowing rotational motion.

Figure 17:
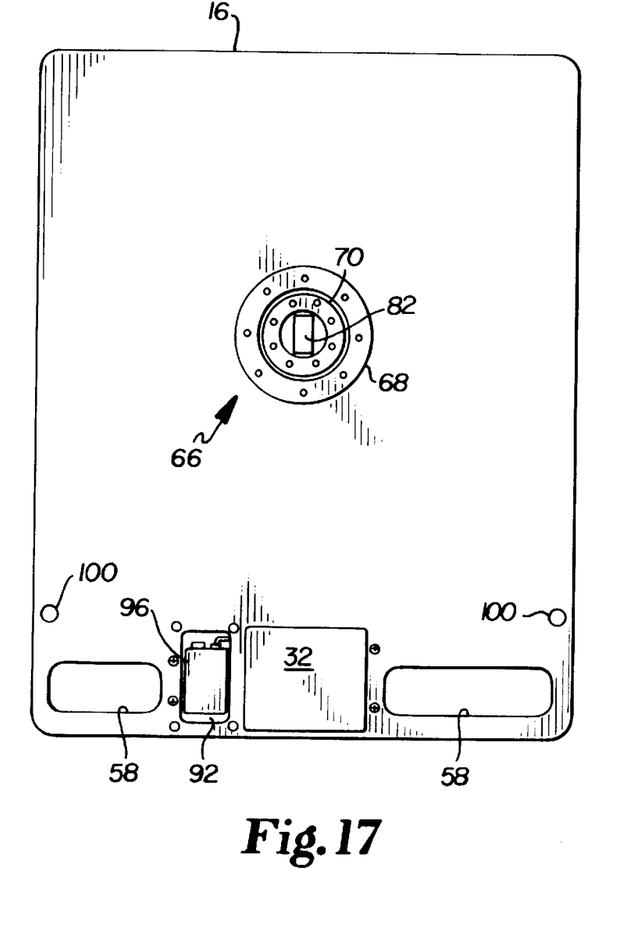
FIG. 17 is a top view of the handle plate with the battery cover removed.
Figure 18:
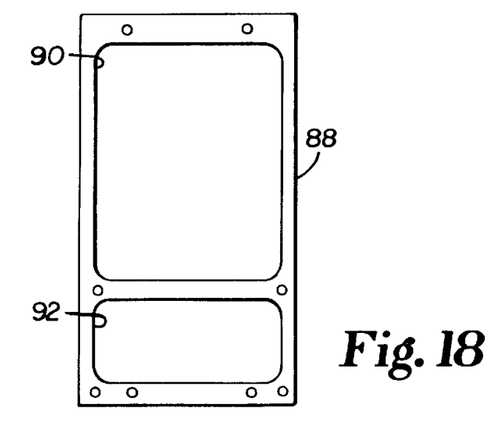
FIG. 18 is a top view of the electrical compartment.
Figure 19:
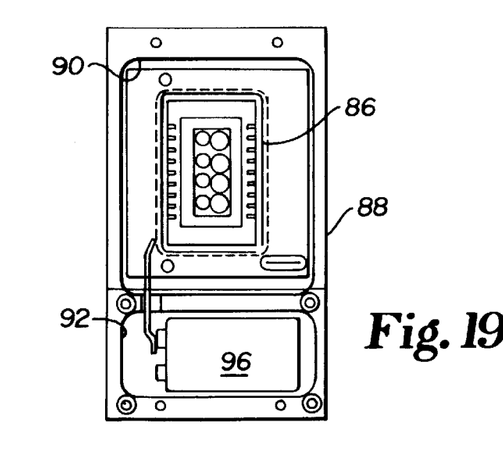
FIG. 19 is a top view of the electrical compartment containing a circuit board and battery.
Figure 20:
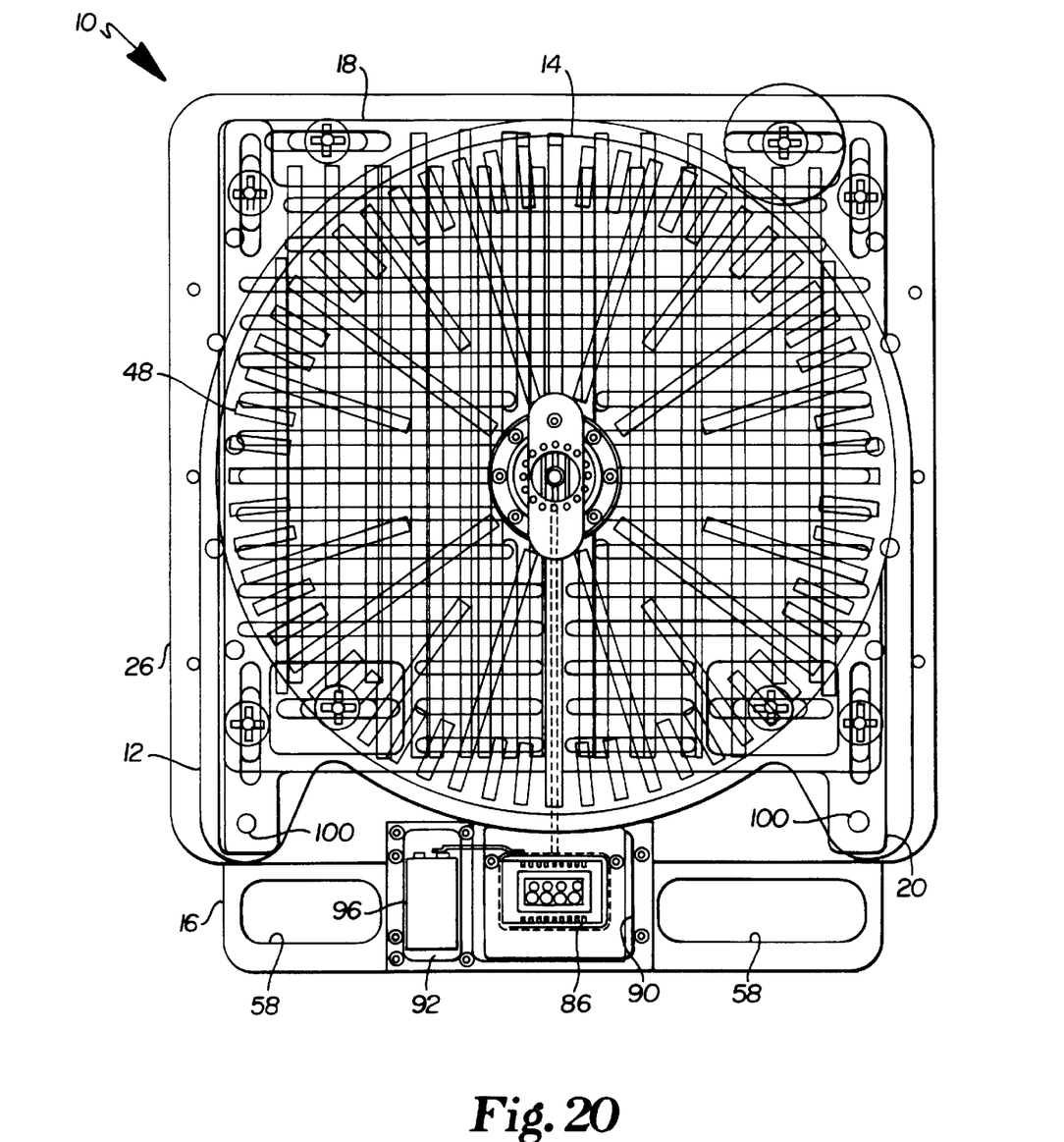
FIG. 20 is an overlapping top view of the elements of the turn plate.

The electrical system 28 includes a potentiometer 30, or variable resistor, that measures the rotational position of the top plate 12. It is anticipated that other proximity or angle detection devices and/or methods could be used to measure the rotational position. The potentiometer's 30 resistance changes when its shaft is rotated. The turn plate 10 is able to detect the rotational orientation or rotational displacement of the potentiometer shaft by measuring the voltage difference or electrical potential across the potentiometer 30. The handle plate 16 also includes a potentiometer aperture, a digital display aperture, and a battery compartment aperture. The potentiometer 30 is placed below the top plate 12 within the potentiometer apertures found within the lower 68 and upper 70 ring retainers and the handle plate 16. A potentiometer shaft stop 82 fits within a shaft stop groove 84 machined into the bottom of the top plate 12. The potentiometer 30, shaft stop 82, shaft stop groove 84, and circuit board 86 cooperate together to measure the rotational position of the top plate 12. It is anticipated that other methods, such as a belt, could be used to integrate the rotation of the top plate to the rotation of the potentiometer. The potentiometer 30 is wired to the circuit board 86 found within the electrical compartment 88, which is divided into a circuit board compartment 90 and a battery compartment 92. The wire 94 is run within a groove machined into the bottom of the handle plate 16 to the electrical compartment 88, which is fixedly attached to the handle plate 16 below the digital display aperture 78 and battery compartment aperture. The electrical compartment 88 also contains a digital display 32 that is functionally connected to the circuit board 86 and designed to display the rotational position of the top plate 12.

As mentioned earlier, the turn plate 10 of the present invention is easy to use. The digital display 32 has two push buttons: an ON/OFF button that toggles the display on and off; and a ZERO button that can set or reset the display to zero degrees at any rotational position of the turn plate. After resetting the display 32, any additional rotational displacement is easily read in the digital display 32 which indicates or displays an angle measurement to a tenth of a degree. The turn plate 10 is also portable. The top plate 12, handle plate 16, lower middle plate 20, and base 26 all have hitch pin apertures 100. All of the plates can be locked into place for storage and transit by aligning the hitch pin apertures 100 and inserting hitch pins 102 through the apertures 100. Furthermore, the electrical system 28 is powered by a single nine volt battery 96. A battery compartment cover 98 is easily unscrewed to allow access to replace the battery 96. In addition, the turn plate 10 is relatively strong and lightweight because many of its elements are machined from aluminum.

The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims. Where a claim is expressed as a means or step for performing a specified function it is intended that such claim be construed to cover the corresponding structure, material, or acts described in the specification and equivalents thereof, including both structural equivalents and equivalent structures.

That which is claimed is:

1. A turn plate apparatus, comprising:
 (a) a base;
 (b) a top plate;
 (c) means for rotatably mounting said top plate to said base, said top plate having a plurality of rotational positions with respect to said base;

(d) means for detecting the rotational position of said top plate;

(e) means for displaying a detected rotational position of said top plate, and (f) a handle plate disposed between said top plate and said base, said means for rotatabley mounting said top plate to said base including means for rotatably mounting said top plate to said handle plate and means for longitudinally mounting said handle plate to said base, whereby said top plate has rotational and longitudinal degrees of motion with respect to said base.

2. The turn plate apparatus of claim 1, wherein said means for displaying a detected rotational position of said top plate includes a digital display mechanism electrically integrated with said means for detecting the rotational position of said top plate.

3. The turn plate apparatus of claim 2, wherein each of said plurality of rotational positions has an angle of displacement, and said means for detecting the rotational position of said top plate includes means for measuring said angle of displacement.

4. The turn plate apparatus of claim 3, wherein said digital display mechanism includes a reset button designed to calibrate said angle of displacement and said display mechanism to zero degrees at any of said plurality of rotational positions of said top plate with respect to said base.

5. The turn plate apparatus of claim 3, wherein said means for measuring said angle of displacement comprises:

(a) a potentiometer having variable resistance;

(b) rotatable means for varying the resistance of said potentiometer;

(c) means for functionally engaging said top plate to said rotatable means for varying the resistance of said potentiometer;

(d) an electrical power supply; and (e) a control circuit electrically connected to said power supply and said potentiometer, whereby said control circuit calculates the resistance of said potentiometer by creating and measuring an electrical potential across said potentiometer and converts the measured resistance of said potentiometer into the detected rotational position of said top plate.

6. The turn plate apparatus of claim 5, wherein said electrical power supply comprises a battery.

7. The turn plate apparatus of claim 5, wherein:

(a) said rotatable means for varying the resistance of said potentiometer includes a rotatable potentiometer shaft extending from said potentiometer; and (b) said means for functionally engaging said top plate to said rotatable means for varying the resistance of said potentiometer includes a potentiometer shaft stop fixedly attached to said potentiometer shaft and a potentiometer shaft stop groove sized and positioned in said top plate to functionally receive said potentiometer shaft stop.

8. The turn plate apparatus of claim 1, further comprising:

(a) an upper bearing retainer disposed beneath said top plate, said upper bearing retainer having a plurality of bearing apertures; and (b) a plurality of bearings seated within said bearing apertures, said bearings being in functional contact with said top plate to assist with a smooth rotation of said top plate.

9. The turn plate apparatus of claim 8, wherein said plurality of bearings includes a plurality of roller bearings and said bearing apertures are arranged radially and are sized to receive said plurality of roller bearings.

10. The turn plate apparatus of claim 9, wherein said plurality of bearing apertures includes a plurality of long apertures, a plurality of intermediate apertures, and a plurality of short apertures arranged to optimize radial spacing of said bearing apertures and said roller bearings in said upper bearing retainer.

11. The turn plate apparatus of claim 1, wherein said handle plate has one or more handle apertures.

12. The turn plate apparatus of claim 1, wherein said means for rotatably mounting said top plate to said handle plate includes a coupling mechanism.

13. The turn plate apparatus of claim 12, wherein said coupling mechanism comprises:

(a) a lower ring retainer fixedly attached to said handle plate, said lower ring retainer having an outer periphery and a lip around said outer periphery; and (b) an upper ring retainer fixedly attached to said top plate, said upper ring retainer having an inner periphery and a lip around said inner periphery;

whereby said lower ring retainer is concentrically seated within said upper ring retainer and the lip of said lower ring retainer securely engages the lip of said upper ring retainer and rotatably couples said top plate to said handle plate.

14. The turn plate apparatus of claim 13, wherein said lower ring retainer, said upper ring retainer, and said handle plate have a potentiometer aperture sized to receive a potentiometer.

15. The turn plate apparatus of claim 1, further comprising:

(a) a middle bearing retainer disposed beneath said handle plate, said middle bearing retainer having a plurality of bearing apertures; and (b) a plurality of bearings seated within said bearing apertures, said bearings being in functional contact with said handle plate to assist with a smooth motion of said handle plate.

16. The turn plate apparatus of claim 15, wherein said plurality of bearings includes a plurality of roller bearings and said plurality of bearing apertures are sized to receive said roller bearings and are arranged to provide smooth longitudinal motion of said handle plate.

17. The turn plate apparatus of claim 11, further comprising a lower middle plate disposed between said middle bearing retainer and said base, said means for longitudinally mounting said handle plate to said base includes means for longitudinally mounting said handle plate to said lower middle plate and means for laterally mounting said lower middle plate to said base, whereby said top plate has rotational, longitudinal, and lateral degrees of motion with respect to said base.

18. The turn plate apparatus of claim 17, further comprising:

(a) a lower bearing retainer disposed beneath said lower middle plate, said lower bearing retainer having a plurality of bearing apertures; and (b) a plurality of bearings seated within said bearing slots, said bearings being in functional contact with said lower middle plate to assist with a smooth motion of said lower middle plate.

19. The turn plate apparatus of claim 18, wherein said plurality of bearings includes a plurality of roller bearings and said plurality of bearing apertures are sized to receive said roller bearings and are arranged to provide smooth lateral motion of said handle plate.

20. The turn plate apparatus of claim 17, further comprising a plurality of retractable hitch pins, wherein said top plate, said handle plate, said lower middle plate, and said base have a plurality of hitch pin apertures sized and arranged to receive said hitch pins and lock said top plate, said handle plate, said lower middle plate, and said base together.

21. A digital turn plate apparatus for use in aligning steering systems, comprising:
  (a) a base;
  (b) a lower bearing retainer disposed on said base, said lower bearing retainer having a plurality of lower bearing apertures;
  (c) a plurality of lower bearings seated within said lower bearing apertures;
  (d) a lower middle plate disposed on said lower bearings and secured to said base, said lower middle plate having a stable, lateral motion with respect to said base;
  (e) a middle bearing retainer disposed on said lower middle plate, said middle bearing retainer having a plurality of middle bearing slots;
  (f) a plurality of middle bearings seated within said middle bearing apertures;
  (g) a handle plate disposed on said middle bearings and secured to said lower middle plate, said handle plate having a stable, longitudinal motion with respect to said base;
  (h) an upper bearing retainer disposed on said handle plate, said upper bearing retainer having a plurality of upper bearing apertures;
  (i) a plurality of upper bearings seated within said upper bearing apertures of said upper bearing retainer;
  (j) a top plate disposed on said upper bearings and rotatably secured to said handle plate, said top plate having a stable, rotational motion with respect to said base;
  (k) a potentiometer having variable resistance;
  (l) a potentiometer shaft extending from said potentiometer, said potentiometer shaft being capable of rotatably varying the resistance of said potentiometer;
  (m) a potentiometer shaft stop fixedly attached to said potentiometer shaft;
  (n) a potentiometer shaft stop groove sized and positioned in said top plate to functionally receive said shaft stop;
  (o) an electrical power supply;
  (p) a control circuit electrically connected to said power supply and said potentiometer, wherein said control circuit calculates the resistance of said potentiometer by creating and measuring an electrical potential across said potentiometer and converts the measured resistance into a detected rotational position of said top plate; and
  (q) a digital display mechanism electrically integrated with said control circuit and designed to display the detected rotational position of said top plate, whereby said top plate has a rotational degree of motion and can be used to adjust tire alignment, and said handle plate has a longitudinal degree of motion and said lower middle plate has a lateral degree of motion to allow a tire that is being aligned to remain generally centered on said top plate during testing.

22. A turn plate apparatus, comprising:
  (a) a base;
  (b) a top plate having rotational and linear degrees of motion with respect to said base, said linear degrees of motion including lateral and longitudinal degrees of motion;
  (c) a first middle plate disposed between said top plate and said base;
  (d) means for laterally and longitudinally mounting said first middle plate to said base;
  (e) means for rotatably mounting said top plate to said first middle plate wherein said first middle plate isolates said rotational degree of motion of said top plate with respect to said base from said linear degrees of motion of said top plate with respect to said base;
  (f) means for detecting the rotational position of said top plate; and
  (g) means for displaying a detected rotational position of said top plate.

23. The turn plate apparatus of claim 22, wherein said means for detecting the rotational position of said top plate includes a potentiometer having variable resistance operably connected between said top plate and said first middle plate, and wherein rotating said top plate with respect to said first middle plate varies the resistance of said potentiometer.

24. The turn plate apparatus of claim 22, further comprising a second middle plate disposed between said first middle plate and said base, wherein said means for laterally and longitudinally mounting said first middle plate to said base includes means for longitudinally mounting said first middle plate to said second middle plate and means for laterally mounting said second middle plate to said base.

25. The turn plate apparatus of claim 24, wherein said means for longitudinally mounting said first middle plate to said second middle plate includes a plurality of roller bearings, a plurality of fasteners, and a bearing retainer and said means for laterally mounting said second middle plate to said base includes a plurality of roller bearings, a plurality of fasteners, and a bearing retainer, each of said bearing retainers having a plurality of parallel roller bearing slots in which said roller bearings are seated and a plurality of parallel fastener slots through which said fasteners extend, said fastener slots being perpendicular to said roller bearing slots and being adapted for guiding and limiting linear motion.

* * * * *